United States Patent [19]

Sugino

[11] Patent Number: 5,235,532

[45] Date of Patent: Aug. 10, 1993

[54] INFORMATION PROCESSING APPARATUS FOR PERFORMING OPERATIONS IN RESPONSE TO THE OPENING AND THE CLOSING OF A COVER THEREOF

[75] Inventor: Toshio Sugino, Tokyo, Japan

[73] Assignee: Canon Kabushiki Kaisha, Tokyo, Japan

[21] Appl. No.: 702,393

[22] Filed: May 20, 1991

[30] Foreign Application Priority Data

Nov. 1, 1990 [JP] Japan .................................. 2-297807

[51] Int. Cl.$^5$ .............................................. G06F 1/00
[52] U.S. Cl. .................................................... 364/707
[58] Field of Search ........................................ 364/707

[56] References Cited

U.S. PATENT DOCUMENTS

| | | | |
|---|---|---|---|
| 4,667,289 | 5/1987 | Yoshida et al. | 364/707 X |
| 4,747,041 | 5/1988 | Engel et al. | 364/707 X |
| 5,008,846 | 4/1991 | Inoue | 364/707 |
| 5,021,983 | 6/1991 | Nguyen et al. | 364/707 |

OTHER PUBLICATIONS

Toshiba T1600 Portable Personal Computer User's Manual, Dec. 1988, pp. 2-1 to 2-3, 2-8 to 2-11.

Primary Examiner—Long T. Nguyen
Attorney, Agent, or Firm—Fitzpatrick, Cella, Harper & Scinto

[57] ABSTRACT

An information processing apparatus includes a cover member of a display unit movable between open and closed positions relative to a main body of the apparatus, and a detector for detecting the open or closed position of the display unit so that predetermined information processing is carried out in response to the detection. In another embodiment an information processing apparatus has a disk drive, a display movable between an open position and a closed position, a detector for detecting the open and closed positions of the display, and a controller for switching a drive control mode of a disk drive motor of the disk drive in accordance with the detection output of the detector. In another embodiment, an information processing apparatus includes a cover accommodating a display therein, movable between open and closed positions for displaying input data on the display unit, a memory for storing input data, an external memory for saving data, a detector in the cover for detecting the open and closed positions of the cover, and a controller for saving the data stored in the memory in the external memory when the closed position of the cover is detected by the detector.

2 Claims, 6 Drawing Sheets

INFORMATION PROCESSING APPARATUS FOR PERFORMING OPERATIONS IN RESPONSE TO THE OPENING AND THE CLOSING OF A COVER THEREOF

BACKGROUND OF THE INVENTION

1. Field of the Invention

The present invention relates to an information processing apparatus, and more particularly to an information processing apparatus having a cover member or a display unit which is movable between an open position and a closed position relative to a main body of the apparatus.

2. Related Background Art

In an information processing apparatus, such as a personal computer or a word processor of a so-called lap-top type, a thin display unit such as a liquid crystal display is attached to a main body of the apparatus such that it is movable between an open position and a closed position. In such an apparatus, the display unit itself serves as a cover member. Alternatively, the display unit may be opened or closed by a cover member.

In such an information processing apparatus having a liquid crystal display unit, where full-day operation is required by a communication function, for example, a back light arranged on the back of the display panel is lit or extinguished in accordance with the open position or the closed position of the display unit, that is, whether the display unit is used or not.

In order to save power for the back light and extend its life, a switch for the back light is arranged on the cover member so that the back light is extinguished when an operator moves the cover member to the closed position and is lit when the operator moves the cover to the open position.

In such an apparatus, a disk drive unit such as a hard disk drive (HDD) or a floppy disk drive (FDD) is usually provided as an external storage device. The disk drive unit needs a so-called warm-up time, that is, a time from the actuation of a disk drive motor which drives a rotary disk medium to a steady rotation speed of the motor to permit the accessing. In order to permit high speed accessing, it is necessary to eliminate the waiting time due to the warm-up time. To this end, in one method for controlling the disk drive motor of the disk drive unit, the motor is continuously driven.

In another method for controlling the drive, the motor is deactuated if accessing is not resumed within a predetermined time period after the previous operation of the disk drive unit, that is, the end of the previous accessing operation.

In prior art information processing apparatus, only the control operation to light or extinguish the back light is carried out in response to the opening or the closing of the display unit. It is convenient for a user if information processing, useful to the operator, is automatically carried out in accordance with the open position or the closed position of the display unit, and this provides a user friendly environment. For example, (a) when the display unit is opened, it means that the user starts to use the apparatus and hence a schedule is displayed.

(b) When the apparatus has a communication function, a record of communication carried out while the display unit was in the closed position (during non-operation) is displayed when the display unit is opened.

(c) When the display unit is closed, that is, when the operation is terminated and information processing is terminated, the processed data is backed up.

Further, where the disk drive motor is continuously driven, particularly in an apparatus which is required for full-day operation, there is a problem of the durability of the device. In addition, a problem of heat generation by the power supply arises and a cooling fan must be continuously driven. This causes noise, particularly at night, and power consumption increases.

The above problem may be solved by deactivating the motor if the accessing operation is not resumed within the predetermined time, as described above. However, since the disk drive motor is stopped if the accessing to the disk drive unit is not frequently performed, a waiting time, due to the warm-up time, is required when the accessing operation is made after a stop. Thus, a high speed accessing is not attained.

Further, in an information processing apparatus which has a switch for the back light on the cover member, if an operator leaves the inner member in the machine with the closed position, power may be shut off by a power failure or another person who does not know that the operator is still using the apparatus, so that data relating to an interrupted job which has not yet been saved in the memory may be lost.

SUMMARY OF THE INVENTION

It is a first object of the present invention to provide an information processing apparatus which automatically carries out the information processing as described in (a) to (c) above in accordance with the opening and the closing of the display unit of the information processing apparatus so that predetermined information processing which is useful to the user when the display unit is moved to the open position or the closed position.

It is a second object of the present invention to provide an information processing apparatus which can eliminate wasteful drive of a disk drive motor or of a cooling fan of the disk drive unit and can eliminate the waiting time due to the warm-up time so that a drive control mode of the disk drive motor is switched to an appropriate mode in accordance with the open position or the closed position of the display unit, that is, whether the information processing apparatus is placed in the use status by the user or not.

It is a third object of the present invention to prevent inadvertent loss of data relating to an interrupted job by a power failure or a third person, without saving the data in the back-up memory.

DETAILED DESCRIPTION OF THE PREFERRED EMBODIMENTS

The first problem described above is solved by the first embodiment of the present invention, the second problem is solved by the second embodiment, and the third embodiment is solved by the third embodiment.

Figure 1:
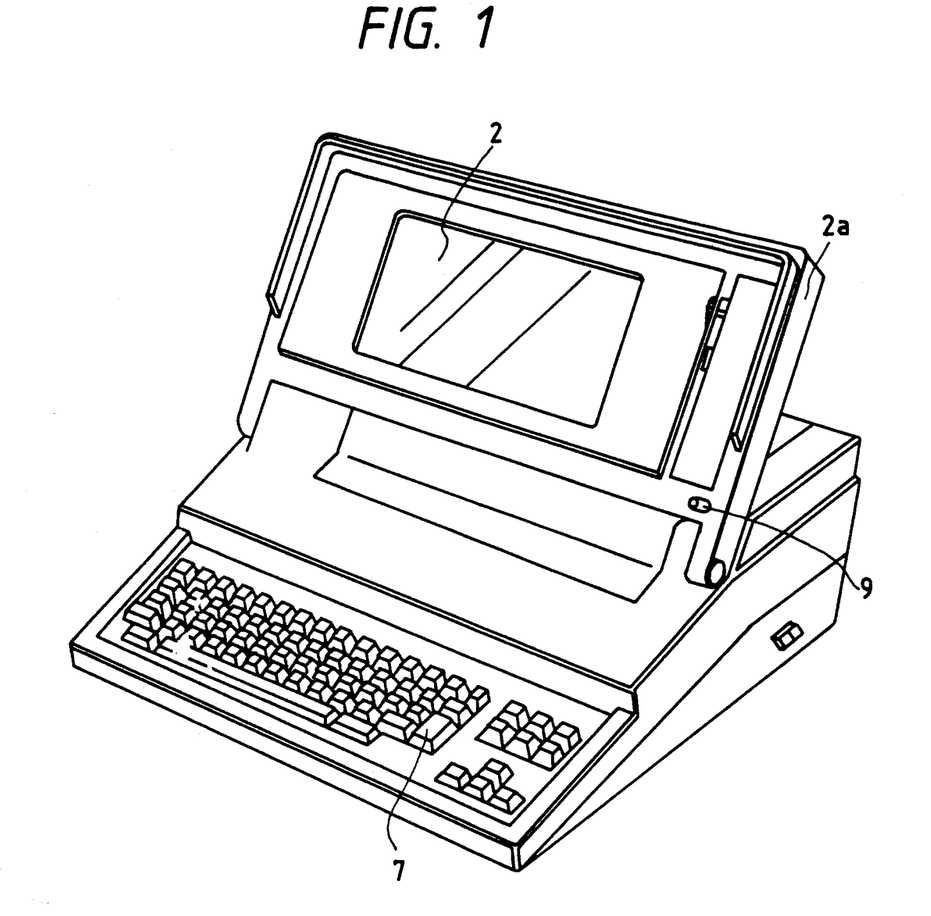
FIG. 1 shows an external perspective view of an information processing apparatus of the present invention.

FIG. 1 shows an external perspective view of the information processing apparatus of the present invention.

A display unit is accommodated in a cover member F, and a switch FS is provided on the cover member F.

Figure 2:
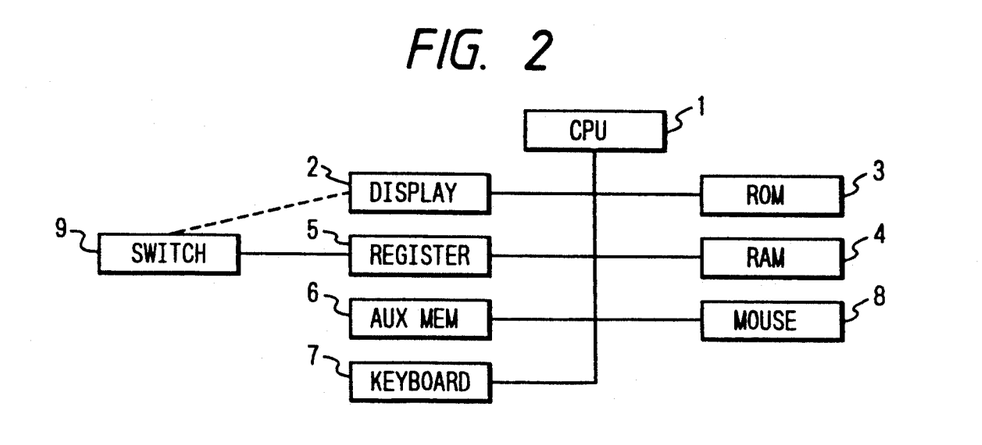
FIG. 2 shows a block diagram of a first embodiment of the information processing apparatus.

FIG. 2 shows a configuration of a first embodiment of the information processing apparatus of the present invention. In the present apparatus, the display unit is movable between an open position and a closed position, and it is assumed that it is operated for an entire day.

In FIG. 2, numeral 1 denotes a central processing unit (CPU) to control the entire apparatus and primarily process information. The following units are connected to the CPU 1 through buses.

A display unit 2 for displaying information comprises a liquid crystal display and it is movable between the open position and the closed position relative to a main body of the apparatus, as described above. An open/close detection switch 9 which is actuated by the opening and the closing of the display unit 2 to detect the open position or the closed position of the display unit 2 is provided. The detected data is held in a detection switch register 5. The CPU 1 reads the data from the register 5 to determine the open/close status of the display unit 2.

On the other hand, a read-only memory (ROM) 3 stores information necessary for the control such as a control program for the CPU 1. A random access memory (RAM) 4 is used as a working area of the control program and a memory area to which an application program is loaded for execution.

An external storage unit 6 which comprises a hard disk drive and/or a floppy disk drive stores the application programs and data. The application programs stored in the external storage 6 include a program for jobs to be executed by the information processing apparatus when the display unit is moved to the open position or the closed position, that is, the displaying of a schedule or a record of communication when the display unit is opened and the backingup of data when the display unit is closed.

A keyboard 7 as input means and a mouse 8 as a pointing device are connected to the CPU 1. A touch panel may be provided as another input device. A program called an input monitor, which enables the use of those input devices by a plurality of application programs and which permits each input device to input information to the related application programs for the input processing by the application programs, is included in the control program of the CPU 1.

In the present embodiment, the open/closed position of the display unit 2 is detected by the open/close detection switch 9, and the schedule or the record of communication is displayed, or the data is backed up when the display unit 2 is moved to the open position or the closed position depending on the detection output of the switch 9. The control is effected in a procedure shown in FIG. 3, by the input monitor of the control program of the CPU 1.

Figure 3:
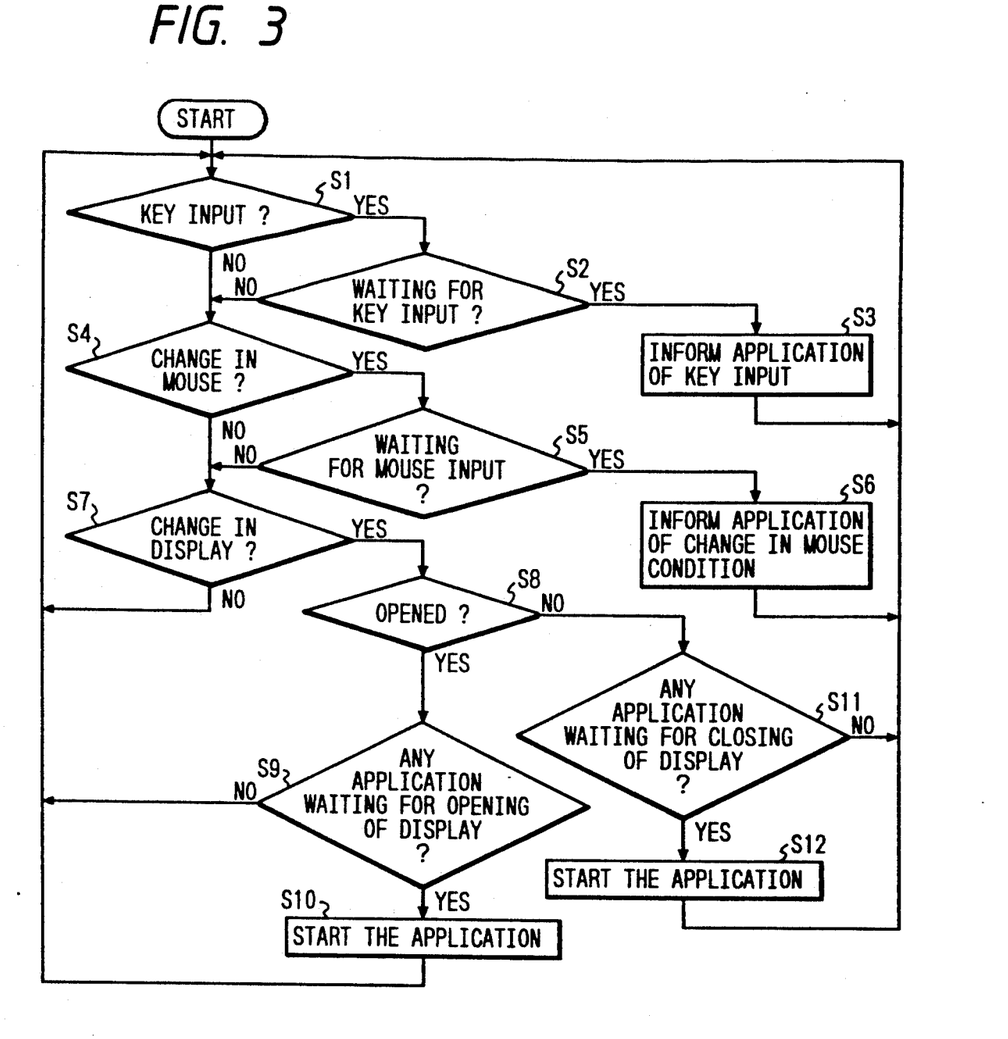
FIG. 3 shows a flow chart of input processing by an input monitor of the apparatus.

In the process of FIG. 3, whether there has been a key entry from the keyboard 7 or not is determined in step S1. If there has been, whether the application program is waiting for the key entry or not is determined in a step S2. If it is, the application program is informed of the key entry in step S3, and the process returns to the step S1. The application program to which the key entry was informed executes an operation for the key entry, which is not shown or explained.

On the other hand, if no key entry is detected in the step S1, or there is no application program which is waiting for the key entry, the process proceeds to a step S4 to determine if there has been a change in a status (input) of the mouse 8. If there has been, whether an application program is waiting for the mouse entry or not is determined in a step S5. If it is, the change in the status of the mouse 8 is informed to the application program, and the process returns to the step S1. The application program to which the mouse entry was informed carries out an operation which is not shown or explained.

When there is no change in the status of the mouse 8 or there is no application program which waits for the mouse entry, the process proceeds to a step S7 to determine by the content of the register 5 whether there has been a change in the open/close status of the display unit.

If there has been a change, the process proceeds to a step S8 to determine whether the display unit has been opened or not. If it has been, whether there is an application program which is waiting for the opening of the display unit or not is determined in a step S9. If there is, the application program is started in a step S10, and the process returns to the step S1. If there is no such application program in the step S9, the process directly returns to the step S1.

On the other hand, if the closing of the display unit instead of the opening is detected in the step S8, the process proceeds to a step S11 to determine if there is an application program which waits for the closing of the display unit or not. If there is such an application program, the application program is started in a step S12, and if there is no such application program, the process returns to a step S1.

In this manner, when the display unit 2 is opened or closed, the schedule or the record of communication is displayed or the data is saved for back-up. Since the information processing which is useful to the user is automatically carried out in accordance with the open/close status of the display unit, a user-friendly environment is provided.

In the present embodiment, since the input monitor monitors the opening and the closing of the display unit 2, the application program, which waits for the opening or the closing of the display unit 2, need not monitor the opening or the closing. Accordingly, the structuring of the application program is facilitated.

In accordance with the present invention, the information processing apparatus having the display unit movable between the open position and the closed position has means for detecting the opening or the closing of the display unit so that the predetermined information processing is carried out when the opening or the closing of the display unit is detected by the detection means. Accordingly, when the display unit is opened or closed, the predetermined information processing which is useful to the user is automatically carried out and the user-friendly environment is provided.

Figure 4:
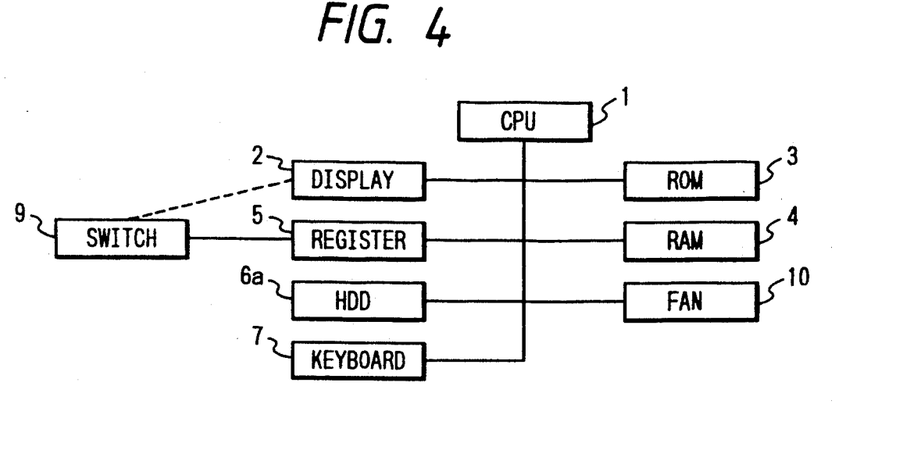
FIG. 4 shows a block diagram of a second embodiment of the information processing apparatus of the present invention.

FIG. 4 shows a configuration of a second embodiment of the information processing apparatus of the present invention. It is assumed that the apparatus of the present embodiment has the display unit movable between the open position and the closed position relative to the main body of the apparatus and is operated on full-day duty.

In FIG. 4, numeral 1 denotes a CPU which controls the entire apparatus and primarily carries out the information processing. The following units are connected to the CPU 1 through buses.

A display unit 2 for displaying information comprises a liquid crystal display and is movable between the open position and the closed position relative to the main body of the apparatus as described above. An open/close detection switch 9 actuated by the opening and the closing of the display unit 2 for detecting the open/close status of the display unit 2 is provided, and the detected open/close data is held in a detection switch register 5. The CPU 1 reads the data from the register 5 to determine the open/close status of the display unit 2.

On the other hand, a ROM 2 stores information necessary for the control such as a control program of the CPU 1. A RAM 4 is used as a working area for the control program and a memory area to which application programs are loaded for execution.

Application programs and data are stored in a hard disk drive (HDD) which serves as an external storage. The HDD 6a is incorporated in the main body of the information processing apparatus.

A fan 10 for cooling the interior of the main body of the information processing apparatus is provided. Since much heat is generated from a disk drive motor of the HDD 6a in the main body of the apparatus, the fan 10 is driven in response to the drive of the disk drive motor, as will be explained later.

A keyboard 7 as input means is connected to the CPU 1.

The CPU 1 controls the entire apparatus in accordance with the control program. For the control of the disk drive motor of the HDD 6a and the cooling fan 10, the drive control mode is switched in accordance with the open/close status of the display unit 2 detected by the open/close detection switch 9 to select a mode in which they are driven only when the HDD 6a is used or a mode in which they are continuously driven. The processing is carried out in a procedure shown in FIG. 5. The routine of the following process is executed at an appropriate timing such as a waiting time for a key entry from the keyboard 7.

Figure 5:
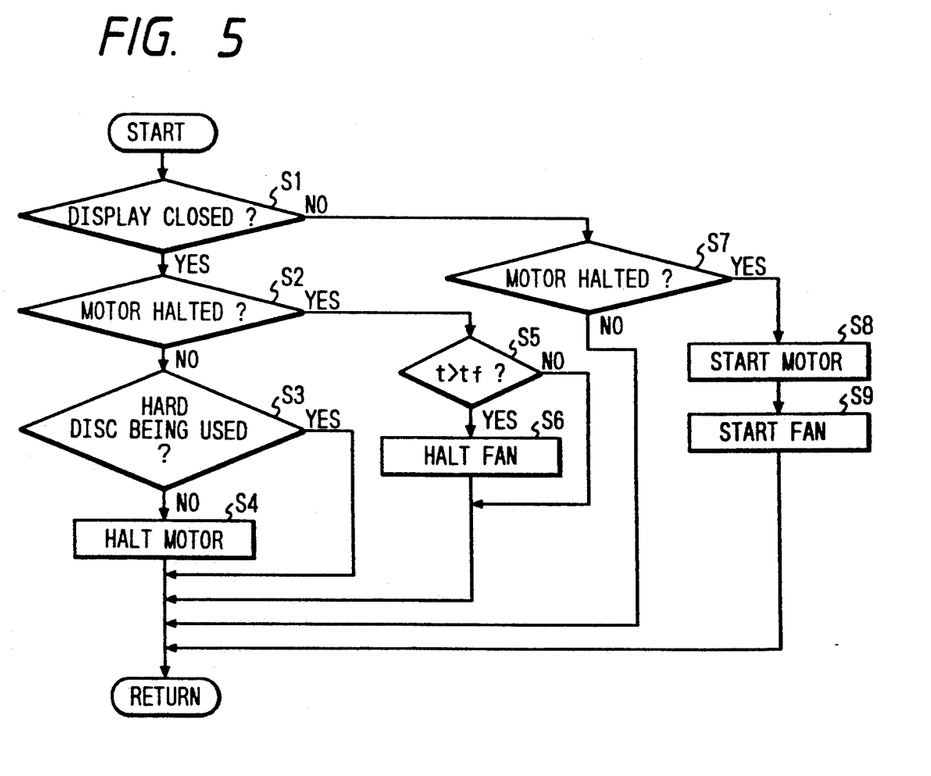
FIG. 5 shows a flow chart of a drive control of a CPU to an HDD and a fan motor in accordance with the opening and the closing of the cover.

In the process of FIG. 5, the CPU 1 determines whether the display unit 2 is closed or not by the data of the detection switch register 5 in a step S1. If it is closed, whether the motor of the HDD 6a is stopped or not is determined in a step S2. If it is not stopped, whether the HDD 6a is being used for communication processing or spool printing or not is determined in a step S3. If it is being used, the process returns to a main routine, and if it is not being used, the motor of the HDD 6a is stopped in a step S4 and then the process returns to the main routine.

When the motor of the HDD 6a is stopped in the step S2, the process branches to a step S5 to compare an elapsed time t since the last access to the HDD 6a with a predetermined fan stop time tf. If the time t is longer than the time tf, the fan 10 is stopped in a step S6 and the process returns to the main routine. If the time t is not longer than the time tf, the process directly returns to the main routine. The fan stop time tf is preset by a presetting program or a dip switch.

On the other hand, if the opening of the display unit 2 is detected in the step S1, the process branches to a step S7 to determine if the motor of the HDD 6a is stopped or not. If it is not stopped, the process returns to the main routine, and if it is stopped, the motor of the HDD 6a is activated in a step S8. In a step S9, the fan 10 is activated and the process returns to the main routine.

In the present embodiment, the drive control mode for the motor of the HDD 6a and the drive control mode of the fan 10 is switched to the mode in which the motor is stopped unless the HDD 6a is used if the display unit 2 is in the closed position, that is, when it is judged that the user does not directly use the information processing apparatus, and switched to the continuous drive mode when the display unit 2 is in the open position and it is judged that the user directly uses the information processing apparatus.

Accordingly, the user need not wait for the warm-up time, and when the HDD 6a is not used, the motor and the fan are not uselessly driven and the durability of the HDD 6a is extended. Further, since useless drive of the motor and the fan 10 is avoided, the generation of noise, particularly at the night, is stopped, a quiet environment of use is assured, and a power consumption is reduced.

The above control process may be executed at a time when the apparatus is in the spool printing mode in which printing is done by background or during a communication. The process which is executed during the spool printing is shown in FIG. 6.

Figure 6:
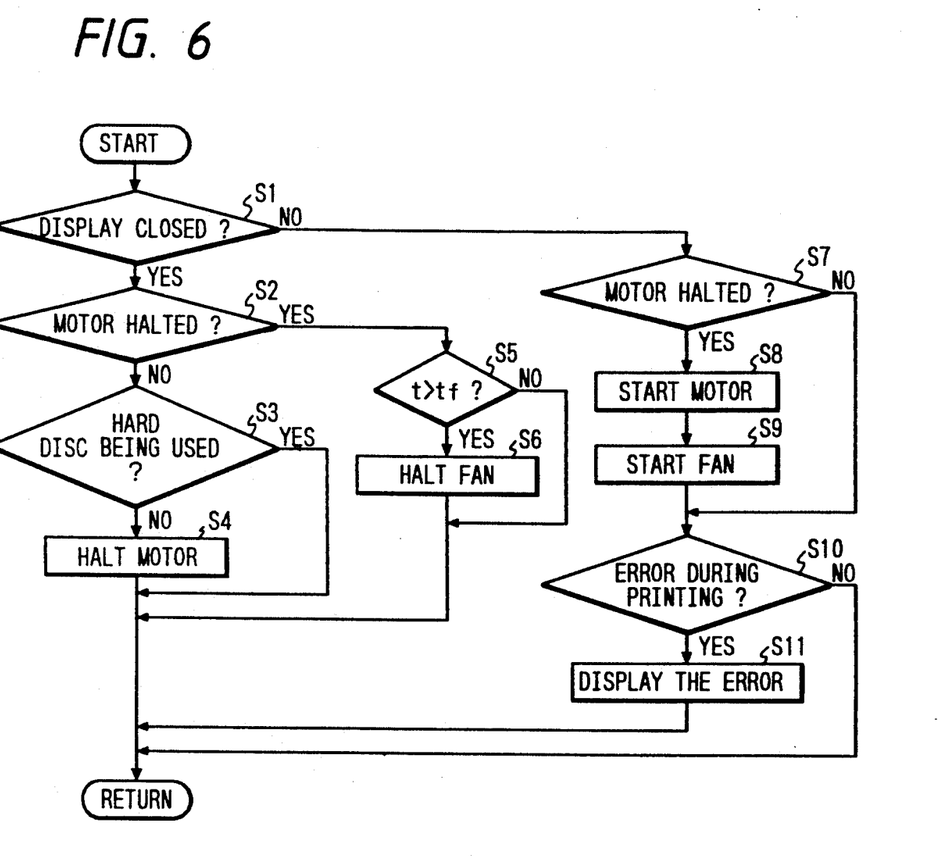
FIG. 6 shows a flow chart when the above control is effected during spool printing.

The process of FIG. 6 is essentially same as that of FIG. 5 except that steps S10 and S11 are added. When the display unit 2 is in the open position, the steps S7 to S9 are executed and whether an error such as a lack of paper, or a jam has occurred, during spool printing or not is determined in step S10, and if there has been no error, the process returns to the main routine. If there has been an error, the error is displayed on the display unit 2 in a step S11 and the process returns to the main routine.

Figure 7:
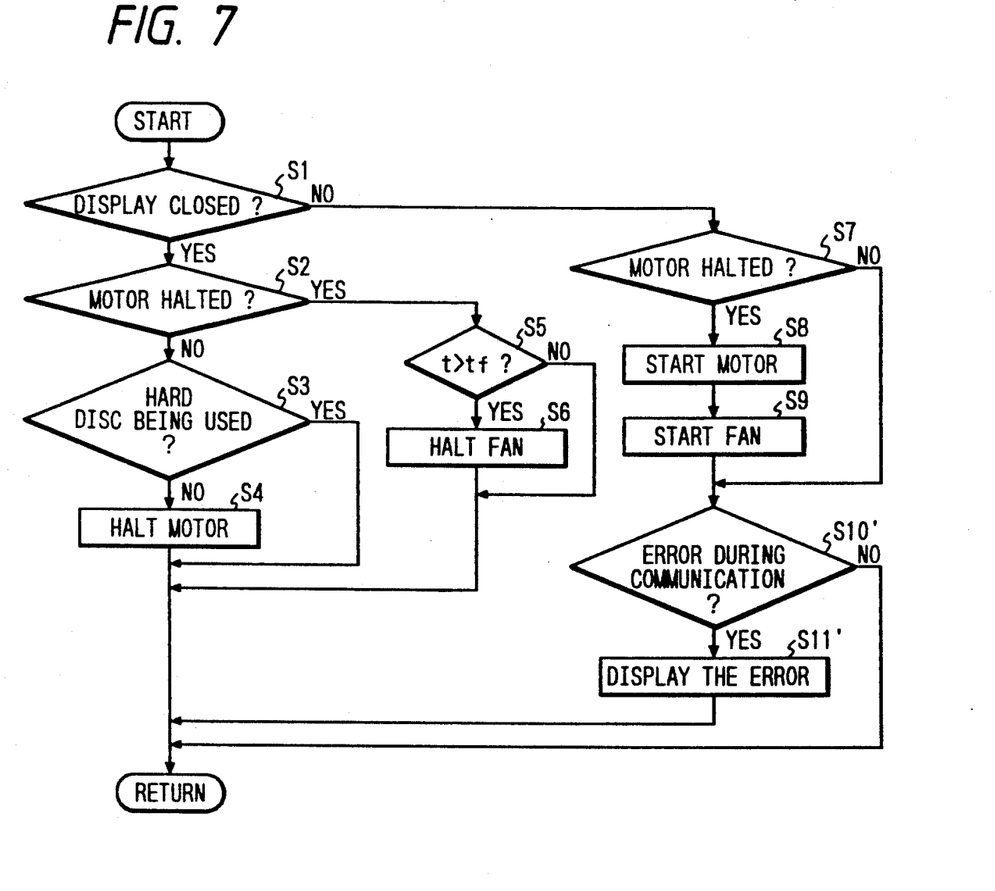
FIG. 7 shows a flow chart when the above control is effected during communication.

FIG. 7 shows a process which is executed during a communication. Steps S10' and S11' are inserted in place of the steps S10 and S11 of FIG. 6. Whether an error has occurred during the communication or not is determined, and if it has occurred, the error is displayed in the step S11', and the process returns to the main routine.

When the control process is executed during spool printing or a communication operation, the error is displayed in accordance with the error status if the display unit 2 is in the open position to permit the operation.

In accordance with the present invention, the information processing apparatus having the disk drive unit and the display unit which is movable between the open position and the closed position comprises means for detecting the open/close status of the display unit and the control means for switching the drive control mode for the disk drive motor of the disk drive unit in accordance with the detection output of the display unit. Accordingly, the drive control mode of the disk drive motor can be switched to an appropriate mode in accordance with the open/close status of the display unit, that is, whether the information processing apparatus is ready to be directly used by the user or not. For example, the drive control mode may be switched between the continuous drive mode and the mode in which the motor is driven only when the disk drive unit is used so that a waiting time due to the warm-up time when the user uses the disk drive units is eliminated, wasteful drive of the disk drive motor during the non-operation of the disk drive unit is avoided, the durability of the apparatus is improved, noise is reduced, and a reduction of the power consumption is attained.

Figure 8:
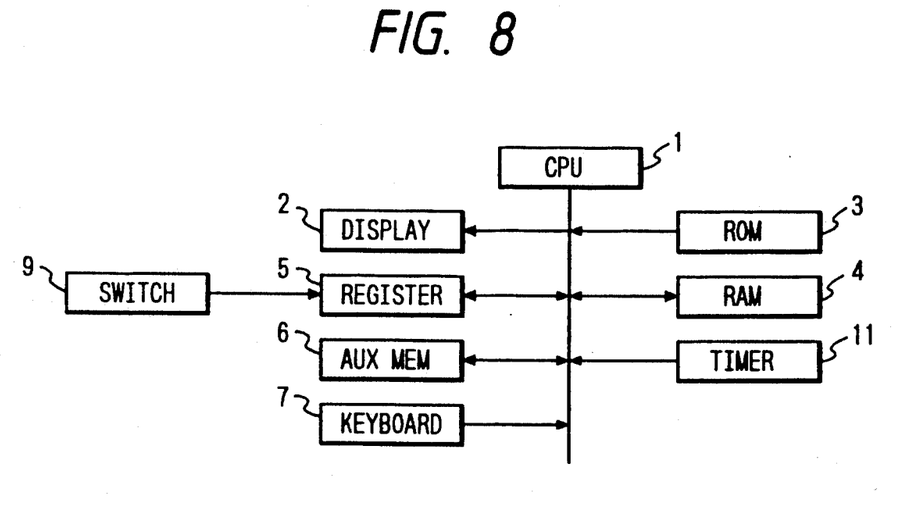
FIG. 8 shows a block diagram of a third embodiment of the information processing apparatus of the present invention.

FIG. 8 shows a block diagram of a third embodiment of the information processing apparatus of the present invention.

Numeral 1 denotes a CPU comprising a microprocessor, numeral 2 denotes a display unit such as a liquid crystal display mounted on a cover member 2a, numeral 3 denotes a read-only memory (ROM) which stores a control program, numeral 4 denotes a random access memory (RAM) which serves as a work area for programs and data, and numeral 5 denotes a detection switch register provided on the cover member 2a to hold the output of the open/close detection switch 9; when the cover member 2a is not in the closed position, it stores "0", and when it is in the closed position, it stores "1".

Numeral 6 denotes an external storage which stores application programs and data, numeral 7 denotes a keyboard and numeral 11 denotes a timer.

An operation of the third embodiment of the information processing apparatus of the present invention is now explained with reference to FIG. 9.

Figure 9:
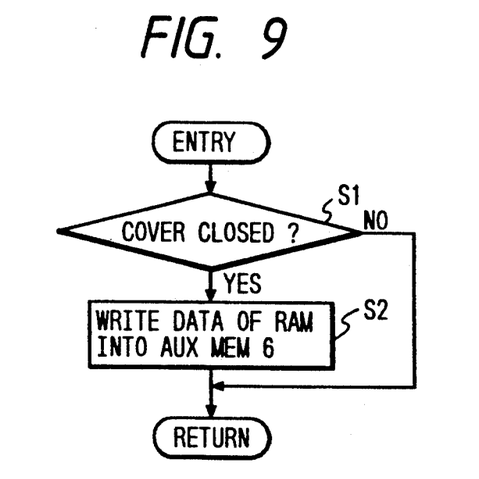
FIG. 9 shows a flow chart of an operation of the information processing apparatus of the present invention.

The program of FIG. 9 is executed at a timing of a predetermined time interval by a timer 11.

In a step S1, whether the content of the detection switch register 5 is "1" or "0" is determined at the predetermined timing to determine the open/close status of the cover member 2a. If the cover member 2a is in the closed position ("1"), the data stored in the RAM 4 is written into a preassigned memory area of the external storage 6 in a step S2.

In accordance with the information processing apparatus of the present invention, the open/close detection switch is provided on the cover member in which the display unit is accommodated and the content of the RAM is written into the external storage. Accordingly, when the apparatus is left while the cover member is closed, the loss of the data relating to the interrupted job, which would not otherwise been saved in the external storage device, is prevented even if another person shuts off the power without knowing that the apparatus is left in the interrupted state.

What is claimed is:

1. An information processing apparatus comprising:
a cover member supported movably between an open position and a closed position relative to a main body of said apparatus;
detection means for detecting the open position of said cover member relative to the main body of said apparatus;
first and second drive means for driving a disk and a cooling fan, respectively; and
drive control means for activating said first drive means and then activating said second drive means when said detection means detects that said cover member is in the open position and deactivating said second drive means after said first drive means is deactivated when said cover member is in the closed position.

2. An information processing apparatus according to claim 1 further comprising a keyboard arranged in the main body of said apparatus and a display arranged in said cover member.

* * * * *

UNITED STATES PATENT AND TRADEMARK OFFICE
CERTIFICATE OF CORRECTION

PATENT NO. : 5,235,532
DATED : August 10, 1993
INVENTOR(S) : TOSHIO SUGINO

It is certified that error appears in the above-indentified patent and that said Letters Patent is hereby corrected as shown below:

COLUMN 2

Line 23, "inner member in the" should be deleted.
Line 24, "the" should read --the cover member in the--.

COLUMN 6

Line 41, "same" should read --the same--.

COLUMN 8

Line 15, "been" should read --have been--.
Line 37, "claim 1" should read --claim 1,--.

Signed and Sealed this

Fifth Day of April, 1994

Attest:

BRUCE LEHMAN

Attesting Officer

Commissioner of Patents and Trademarks